United States Patent
Pretzlaff et al.

(10) Patent No.: US 12,431,296 B2
(45) Date of Patent: Sep. 30, 2025

(54) ELECTRICAL FEED-THROUGH OF AN ELECTROLYTIC CAPACITOR

(71) Applicant: KEMET Electronics Portugal, S.A., Évora (PT)

(72) Inventors: Bernd Pretzlaff, Mildstedt (DE); Janosch Lichtenberger, Bremen (DE)

(73) Assignee: KEMET Electronics Portugal, S.A., Evora (PT)

( * ) Notice: Subject to any disclaimer, the term of this patent is extended or adjusted under 35 U.S.C. 154(b) by 295 days.

(21) Appl. No.: 18/250,180

(22) PCT Filed: Oct. 27, 2021

(86) PCT No.: PCT/EP2021/079790
§ 371 (c)(1),
(2) Date: Apr. 21, 2023

(87) PCT Pub. No.: WO2022/090298
PCT Pub. Date: May 5, 2022

(65) Prior Publication Data
US 2023/0395328 A1  Dec. 7, 2023

(30) Foreign Application Priority Data

Oct. 29, 2020 (EP) ..................................... 20204584

(51) Int. Cl.
*H01G 9/008* (2006.01)
*H01G 9/00* (2006.01)
*H01G 9/10* (2006.01)

(52) U.S. Cl.
CPC ........... *H01G 9/008* (2013.01); *H01G 9/0029* (2013.01); *H01G 9/10* (2013.01)

(58) Field of Classification Search
CPC ........ H01G 9/008; H01G 9/0029; H01G 9/08; H01G 9/10

(Continued)

(56) References Cited

U.S. PATENT DOCUMENTS 3,091,656 A * 5/1963 Lamoureaux, Jr. ...... H01G 9/10
  174/556
3,354,359 A * 11/1967 Ford ........................ H01G 9/10
  361/520

(Continued)

FOREIGN PATENT DOCUMENTS

EP  2061048 A1  5/2009
EP  2367186 A2  9/2011

(Continued)

OTHER PUBLICATIONS

European Search Report mailed on Apr. 20, 2021, by the European Patent Office for Application No. EP20204584.5. (11 pages).

(Continued)

*Primary Examiner* — Timothy J Thompson
*Assistant Examiner* — Michael F McAllister
(74) *Attorney, Agent, or Firm* — Joseph T. Guy; Patent Filing Specialist Inc.

(57) ABSTRACT

The invention relates, amongst others, to a feedthrough pin of an electrolytic capacitor for contacting an electrode of the electrolytic capacitor and providing an electrical contact of the electrolytic capacitor on an outside of the electrolytic capacitor, the feed-through pin comprising a longitudinally extending body. According to an aspect of the invention, a first circumferential protrusion is arranged between a first section of the longitudinally extended body and a second section of the longitudinally extended body, wherein the first circumferential protrusion runs around a longitudinal axis of the longitudinally extended body and extends radially outwards over an outer contour of the first section of the longitudinally extended body and an outer contour of the second section of the longitudinally extended body.

15 Claims, 9 Drawing Sheets

(58) Field of Classification Search
USPC .......................................................... 174/650
See application file for complete search history.

(56) References Cited

U.S. PATENT DOCUMENTS

| | | | | |
|---|---|---|---|---|
| 3,766,442 | A * | 10/1973 | Pearce | H01G 4/236 |
| | | | | 361/520 |
| 6,137,053 | A * | 10/2000 | Andou | H01G 11/74 |
| | | | | 174/50.56 |
| 7,118,425 | B2 * | 10/2006 | Chen | H01R 4/06 |
| | | | | 439/736 |
| 7,696,002 | B1 * | 4/2010 | Ribble | H01G 9/008 |
| | | | | 29/25.03 |
| 2002/0075634 | A1 | 6/2002 | Uenishi et al. | |
| 2012/0205150 | A1 | 8/2012 | Pretzlaff et al. | |
| 2012/0261183 | A1 | 10/2012 | Pretzlaff et al. | |
| 2018/0219193 | A1 | 8/2018 | Mccurry et al. | |

FOREIGN PATENT DOCUMENTS

| | | |
|---|---|---|
| JP | 2008235322 A | 10/2008 |
| WO | 2009107177 A1 | 9/2009 |

OTHER PUBLICATIONS

European Search Report mailed on Jul. 6, 2021, by the European Patent Office for Application No. EP20204584.5. (12 pages).
International Search Report (PCT/ISA/210) and Written Opinion (PCT/ISA/237) mailed on Jul. 7, 2022, by the European Patent Office as the International Searching Authority for International Application No. PCT/EP2021/079790. (20 pages).
Partial European Search Report mailed on Feb. 28, 2022, by the European Patent Office for Application No. PCT/EP2021/079790. (11 pages).

* cited by examiner

ELECTRICAL FEED-THROUGH OF AN ELECTROLYTIC CAPACITOR

CROSS-REFERENCE TO RELATED APPLICATIONS

This application is the United States National Phase under 35 U.S.C. § 371 of PCT International Patent Application No. PCT/EP2021/079790, filed on Oct. 27, 2021, which claims the benefit of European Patent Application No. 20204584.5, filed on Oct. 29, 2020, the disclosures of which are hereby incorporated by reference herein in their entireties.

TECHNICAL FIELD

The present invention relates to a feedthrough pin of an electrolytic capacitor according to the preamble of claim 1, to a feedthrough assembly of an electrolytic capacitor and a feedthrough flange according to the preamble of claim 3, to a method for manufacturing a composite contact element for an electrolytic capacitor according to the preamble of claim 5, to a contact element obtainable with such a method according to claim 7, to a method for manufacturing an electrical feedthrough for an electrolytic capacitor according to the preamble of claim 8, to an electrical feedthrough for an electrolytic capacitor obtainable with such a method according to claim 11, to a method for conditioning a metallic surface of an electrical feedthrough of an electrolytic capacitor according to the preamble of claim 12, and to a feedthrough for an electrolytic capacitor obtainable with such a method according to claim 15.

BACKGROUND

An electrical feedthrough typically comprises a feedthrough pin guided through a feedthrough opening of an electrolytic capacitor. The space surrounding the feedthrough pin may be casted with an epoxy resin to achieve fixation and insulation of the feedthrough pin. However, such an arrangement bears the risk that the feedthrough pin loosens due to thermic expansion or mechanic impact which in turn results in leakages.

Furthermore, if the feedthrough pin is contacted by or joined with an outside electric conductor, e.g., a wire or a ribbon, via laser welding, the additional risk exists that the laser light burns the epoxy resin (i.e., the insulation) and thus provokes a short circuit and/or loss of hermetic sealing.

It is also difficult to establish an electrical contact to the feedthrough pin of an electrolytic capacitor by laser welding for other reasons. The feedthrough pin of an electrolytic capacitor is made from the metal of the electrode. Typically, such an electrode is made from a valve metal such as aluminum, niobium, tantalum or zirconium. These materials are, however, not appropriate for laser welding.

Establishing an electrical contact by a feedthrough pin of an electrolytic capacitor has also further challenges. Prior art teaches to establish an electrical feedthrough by means of an elastic protective sleeve surrounding a feedthrough wire. However, the feedthrough wire can be displaced resulting in damages in the inside of the capacitor. Furthermore, such displacement does not guarantee safe sealing against an electrolyte leakage.

Furthermore, it is known to establish an electrical feedthrough with an insulation of glass. Such a glass insulation is, however, not possible in case of an aluminum electrolytic capacitor since aluminum has a low melting temperature lying below the melting temperature of appropriate glasses.

Furthermore, it is known to establish an electrical feedthrough by means of a feedthrough pin insulated against a housing with an epoxy resin. However, it is difficult to safely position a feedthrough pin within a feedthrough opening used for guiding the feedthrough pin from an inside of the capacitor to an outside thereof. There is the risk that the position of the feedthrough pin changes during casting the epoxy resin into the feedthrough opening. In such a case, the necessary insulation distances may be underrun. Since there is only a single casting of epoxy resin possible, no redundancy fallback exists for compensating such underrun of insulation distances. Consequently, a capacitor having too small insulation distances needs to be discarded.

Additionally, it is known from prior art that a connection of an epoxy resin and an aluminum surface is often mechanically instable.

The present disclosure is directed toward overcoming one or more of the above-mentioned problems, though not necessarily limited to embodiments that do.

SUMMARY

Summarizing, there exists a wealth of problems and difficulties regarding the electrical contact of an electrode of an electrolytic capacitor from an outside of the electrolytic capacitor. It is an objective of the present invention to overcome the discussed prior art shortcomings and to ameliorate the electrical contacting of an electrode of an electrolytic capacitor from an outside of the capacitor.

At least this objective is achieved, in an aspect, with a feedthrough pin of an electrolytic capacitor for contacting an electrode of the electrolytic capacitor (typically the anode of an electrolytic capacitor) and for providing an electrical contact of the electrolytic capacitor on an outside of the electrolytic capacitor. The feedthrough pin comprises a longitudinally extended body. According to an aspect of the presently claimed invention, a first circumferential protrusion, e.g., a first bead, is arranged between a first section of the longitudinally extended body and a second section of the longitudinally extended body. In this context, the first circumferential protrusion runs around a longitudinal axis of the longitudinally extended body and extends radially outwards over an outer contour of the first section of the longitudinally extended body and an outer contour of the second section of the longitudinally extended body.

During intended operation of the feedthrough pin, the first circumferential protrusion serves as protective shield for a casting substance such as an epoxy resin which is used to embed the feedthrough pin in a feedthrough opening, to insulate the feedthrough pin against a housing of the electrolytic capacitor, and to seal, particularly hermetically, the interior of the electrolytic capacitor from the environment or outside, i.e., to prevent leakage of the electrolyte to the outside or environment. It is then possible to establish an electric contact between the feedthrough pin and an electric wire or ribbon by means of laser welding, because the first circumferential protrusion effectively protects the casting substance arranged beneath the first circumferential protrusion against laser light applied to the feedthrough pin during the laser welding process. Thus, during intended operation of the feedthrough pin, the first circumferential protrusion is arranged at least partially above an upper surface of a casting substance which is used to embed the feedthrough pin in a feedthrough opening of the electrolytic capacitor.

The first circumferential protrusion is a simple but highly effective tool for protecting a casting substance such as an epoxy resin against laser light applied to an upper portion of the feedthrough pin for the purposes of laser welding an electrical contact to the feedthrough pin. Thus, the first circumferential protrusion effectively prevents an undesired burning of an insulation made from a casting substance such as an epoxy resin and, consequently, effectively prevents an undesired short-circuit between the feedthrough pin and the housing of the electrolytic capacitor and/or leakage of the electrolyte to the outside of the capacitor or the environment.

In an embodiment, a second circumferential protrusion, e.g., a second bead, is arranged between the second portion of the longitudinally extended body and a third portion of the longitudinally extended body. The second circumferential protrusion runs around the same longitudinal axis of the longitudinally extended body and extends radially outwards over an outer contour of the second portion of the longitudinally extended body and an outer contour of the third portion of the longitudinally extended body. Thus, in this embodiment, the feedthrough pin comprises two circumferential protrusions being located at a distance to each other on the longitudinally extended body of the feedthrough pin. During intended operation of the feedthrough pin, the second circumferential protrusion serves for better anchoring the feedthrough pin in a feedthrough opening, wherein particularly the second circumferential protrusion locks the pin in the cured casting substance. Consequently, a highly stable placement of the feedthrough pin in a feedthrough opening is made possible by providing the second circumferential protrusion. A combination of the first bead and the second circumferential protrusion thus serves for stable anchoring of the feedthrough pin in the feedthrough opening and prevents damages of a casting substance used for fixating the feedthrough pin in the feedthrough opening when laser light is applied afterwards to a top portion of the feedthrough pin.

The first circumferential protrusion and the second circumferential protrusion serve both individually and in combination with each other for a higher safety and reliability of an electrical feedthrough of an electrolytic capacitor.

In an aspect, the present invention relates to a feedthrough assembly of an electrolytic capacitor comprising a feedthrough pin and a feedthrough flange having a feedthrough opening in which the feedthrough pin is disposed. Also, in this context, the feedthrough pin serves to contact an electrode of the electrolytic capacitor, and to provide an electrical contact of the electrolytic capacitor on an outside of the electrolytic capacitor. The feedthrough pin comprises a longitudinally extended body.

According to the present invention it is particularly envisioned that a second circumferential protrusion, e.g., a second bead, is arranged between a second section of the longitudinally extended body and a third section of the longitudinally extended body. The second circumferential protrusion runs around a longitudinal axis of the longitudinally extended body. Furthermore, the second circumferential protrusion extends radially outwards over an outer contour of the second section of the longitudinally extended body and over an outer contour of the third section of the longitudinally extended body.

It is furthermore particularly envisioned according to the present invention that a wall of the feedthrough flange that surrounds the feedthrough opening comprises a first groove and a second groove facing the feedthrough pin. The feedthrough pin and the feedthrough flange are arranged with respect to each other such that the second circumferential protrusion is located in a region of the feedthrough opening in which the wall comprises the first groove and the second groove and a section between the first groove and the second groove. Thus, the feedthrough pin is positioned in the feedthrough opening such that the second circumferential protrusion is in approximately the same height as the first groove, the second groove and/or the section between the first groove and the second groove. If the casting substance such as an epoxy resin is filled into a space between the feedthrough pin and the wall of the feedthrough flange in order to fixate or anchor the feedthrough pin within the feedthrough opening, the arrangement of the first groove, the second groove and the second bead serves for a safe anchoring of the feedthrough pin and prevents an undesired displacement of the feedthrough pin in the feed-through opening in the longitudinal direction (i.e., along the longitudinal axis of the longitudinally extended body of the feed-through pin). By providing the first groove, the second groove and the second circumferential protrusion, an undesired disintegration or movement of a casting substance filled into a space between the feedthrough pin and the wall of the feed-through flange is significantly exacerbated in comparison to an arrangement having a smooth wall surrounding the feedthrough opening and having a uniformly thick feed-through pin. In other word, the feedthrough pin is locked by the second circumferential protrusion in the cured casting substance filling the space between the feedthrough pin and the cured casting substance is locked in the feedthrough opining via the first and second groove thereby effectively preventing longitudinal displacement of both cured casting substance and feedthrough pin.

In an embodiment, the feedthrough flange is a separate component that can be inserted into a bore of a housing of an electrolytic capacitor. Such an arrangement facilitates providing grooves inside a wall of the feedthrough flange surrounding the feedthrough opening of the feedthrough flange.

In an embodiment, the feedthrough flange is an integral part of a housing of an electrolytic capacitor. In this embodiment, the feedthrough flange cannot be distinguished from other parts of the housing of the electrolytic capacitor. The feedthrough flange is, in this embodiment, structurally defined by providing a feedthrough opening through the housing of the electrolytic capacitor so as to be able to contact an inside of the electrolytic capacitor by a feedthrough pin. This arrangement does not necessitate a separate component for providing such a feedthrough opening. However, it may be more difficult to provide the first groove and the second groove directly within the housing of the electrolytic capacitor than in case of providing them within a feedthrough flange realized as a separate component.

In an embodiment, the housing of the electrolytic capacitor comprises a beaker portion, e.g., deep-drawn or machined, and a lid portion, and the feedthrough flange is joined with the lid portion or is an integral part of the lid portion.

In an embodiment, the feedthrough pin of the feedthrough assembly additionally comprises a first circumferential protrusion, e.g., a first bead, being arranged between a first section of the longitudinally extended body and the second section of the longitudinally extended body. The first circumferential protrusion runs around the longitudinal axis of the longitudinally extended body. Furthermore, it extends radially outwards over an outer counter of the first section of the longitudinally extended body and an outer contour of the second section of the longitudinally extended body. Thus, in this embodiment, the feedthrough pin does not only comprise the second circumferential protrusion for better anchoring the feedthrough pin within the feedthrough opening of the feedthrough flange, but also the first circumferential protrusion that serves for protecting a casting substance filled into a space between the feedthrough pin and a wall surrounding the feedthrough opening against laser light that can be used for laser welding an electrical contact onto the top portion of the feedthrough pin.

In an embodiment, the first circumferential protrusion protrudes over a longer distance from the outer contour of the first portion of the longitudinally extended body and the contour of the second portion of the longitudinally extended body than the second circumferential protrusion does. In such a case, a bigger area of the casting substance can be protected against laser light while still achieving a sufficiently strong fixation of the feedthrough pin within the feed-through opening and ensuring sufficiently big insulation distances.

In an aspect, the present invention relates to a method for manufacturing a composite contact element for an electrolytic capacitor. This method comprises the steps explained in the following.

First, a recess is formed into a front side of a plate of a first metal. The first metal is chosen from the group consisting of aluminum, tantalum, niobium, and zirconium. Aluminum and tantalum, particularly aluminum, are particularly appropriate. The recess can be formed into the front side of the plate by any appropriate material-removing technique, such as milling. A feedthrough pin may be inserted into recess from a backside of the plate via a through-opening in the plate, which may be introduced at any stage of manufacturing, e.g., by drilling, machining or like. Alternatively, the recess may not reach through the plate to the backside thereof and may be only accessible from the front side of the plate. It is possible that the plate comprises a plurality of recesses, particularly a plurality of equally sized recesses.

Afterwards, a backside and edges of the plate are masked with a masking component. Any non-conducting component, such as a plastic, an adhesive tape, or a paint, lacquer or coating, may be used for masking.

Afterwards, a layer of a second metal is galvanically applied onto the front side and the recess of the plate. Due to the masking, the layer will not be formed on the masked backside and the masked edges of the plate since the masking component prevents deposition of the second metal. The second metal is particularly solderable or weldable and is chosen from the group consisting of nickel, nickel-iron, zinc, copper, silver, palladium, gold, platinum or an alloy thereof.

Afterwards, the front side of the plate is abraded such that the second metal remains in the recess. To be more precise, the abrading is carried out such that a front-side surface of the first metal is flush with a front-side surface of the second metal in the recess. Consequently, the second metal does not protrude over the first metal, nor does the first metal protrude over the second metal after this abrading process.

Finally, a contact element is punched out of the plate. The contact element comprises a first section comprising the first metal only and a second section comprising the first metal and the second metal. While other components besides the first metal on the one hand and the first metal and the second metal on the other hand might be present in the contact element, it entirely consists in its first section of the first metal and in its second section of the second metal in an embodiment.

Due to the galvanic deposition process, the layer of the second metal is tightly connected to the first metal. Consequently, it is possible to use the second section of the contact element that comprising also the second metal to establish an electrically and mechanically stable and reliable connection to a further electric component made of a metal different to the first metal, e.g., the second metal or having a contact area made of a metal different to the first metal, e.g., the second metal. This connection can be provided by direct laser welding. For example, direct laser welding of a nickel wire to a contact element made from the first metal only, particularly made from aluminum only, is not possible, since brittle phases form within the melt. However, if a contact element according to the presently discussed aspect of the present invention is used, the portion of the second metal, in particular the nickel portion of the contact element, can be used for establishing an electric contact to another nickel component or another component made from a different electrically conductive metal. Alternatively, this connection may be made by soldering, wherein the second metal and the further electric component or the contact area thereof are particularly solderable.

In an embodiment, the contact element is punched such that it comprises a receiving recess for introducing or receiving a feedthrough pin of an electrolytic capacitor. Then, the feedthrough pin can be inserted into the recess and can be tightly connected with the section of the contact element surrounding the receiving recess. Typically, the receiving recess is formed in the first section of the contact element, wherein the first metal is typically chosen to be the same metal as the metal of the feed-through pin. In case of an aluminum electrolytic capacitor, the feedthrough pin is also made from aluminum. In such a case, the first metal is chosen to be aluminum and the first section comprises aluminum only. Then, the feedthrough pin can be inserted into the recess formed within the aluminum section of the contact element. An electric contact to a further electric component, in particular to a nickel-containing component, can then be established via the second section of the contact element, wherein the second section comprises nickel or another second metal and also aluminum, wherein the electric contact is preferably established by welding or soldering.

In an embodiment, a natural oxide layer of the first metal is removed prior to galvanically depositing the second metal on the plate. A zincate etchant may be used for this purpose. Removing the natural oxide layer is particularly appropriate in case of the first metal being aluminum.

In an embodiment, the plate and the recess filled with the second metal are tempered at a temperature lying in a range of from 100° C. to 400° C., in particular of from 150° C. to 350° C., in particular of from 175° C. to 300° C., in particular of from 200° C. to 250° C., prior to the punching step. Such tampering increases the adhesion between the plate of first metal and the galvanically deposited layer of the second metal.

In an embodiment, the tempering step is performed for a time period lying in a range of from 1 hour to 8 hours, particularly of from 2 hours to 7 hours, particularly of from 3 hours to 6 hours, particularly of from 4 hours to 5 hours.

In an embodiment, the layer of the second metal has a thickness lying within a range of from 0.1 mm to 2.0 mm, particularly from 0.2 mm to 1.9 mm, particularly from 0.3 mm to 1.8 mm, particularly from 0.4 mm to 1.7 mm, particularly from 0.5 mm to 1.6 mm, particularly from 0.6 mm to 1.5 mm, particularly from 0.7 mm to 1.4 mm, particularly from 0.8 mm to 1.3 mm, particularly from 0.9 mm to 1.2 mm, particularly from 1.0 mm to 1.1 mm.

In an aspect, the present invention relates to a contact element that can be obtained by a method according to the preceding explanations. Such a contact element comprises a first section made of the first metal and a second section comprising both the first metal and the second metal. The second metal region of the second section may then be used to establish an electric contact to a further electric component made of a different material or metal as the first metal, particularly made of the second metal, or a contact are of the further electric component made of a different material or metal as the first metal, particularly made of the second metal, preferably by soldering or welding. Preferably, the second metal and the material of the further electric component or the contact area of the further electric component are solderable, thereby enabling a soldering connection between the contact element and the further electric component. To give an example, the contact element may be used to establish a safe and reliable electric contact between an aluminum electrolytic capacitor and a nickel ribbon or a printed circuit board, preferably by soldering or welding.

In an aspect, the present invention relates to a method for manufacturing an electrical feedthrough for an electrolytic capacitor. The method comprises the steps explained in the following.

First, a plug made from a porous sintered plastic material or porous thermoplastic material is provided. The plug is designed and arranged to fit into a feedthrough opening of the electrolytic capacitor. The feedthrough opening serves for housing a feedthrough pin of the electrolytic capacitor for contacting an electrode of the electrolytic capacitor and for providing an electrical contact of the electrolytic capacitor on an outside of the electrolytic capacitor.

Afterwards, a feedthrough pin is guided through an opening in the plug to obtain a plug-pin arrangement. The opening is sized such that the feedthrough pin can be pushed through the opening, wherein the material of the plug surrounding the opening abuts against the feed-through pin guided through the opening so as to establish a sealing against the feedthrough pin. In the plug-pin arrangement, the first part of the feedthrough pin is located on a first side of the plug, and the second part of the feedthrough pin is located in a second side of the plug.

Afterwards, the plug-pin arrangement is inserted into the feedthrough opening of a feedthrough flange of the electrolytic capacitor. When inserting the plug-pin arrangement into the feedthrough opening, care is taken that there remains a space between the feed-through pin and a wall surrounding the feedthrough opening.

Furthermore, the plug is impregnated with a filler-free curable impregnating substance. Afterwards, the impregnating substance is allowed to set. The step of impregnating the plug and allowing the impregnating substance to set needs not necessarily be done after having inserted the plug-pin arrangement into the feed-through opening. Rather, the impregnating step may also be done beforehand.

Afterwards, a filler-containing curable casting substance is filled into the space between the feedthrough pin and the wall surrounding the feedthrough opening. Afterwards, the casting substance is allowed to set. The casting substance provides an electric insulation between the feedthrough pin and the feedthrough flange or other parts of the housing of the electrolytic capacitor. Furthermore, the casting substance provides for a sealing of an interior of the electrolytic capacitor against an outside and thus prevents leakage of an electrolyte of the electrolytic capacitor.

In an embodiment, the plug is plasma-activated prior to impregnating it with the filler-free curable impregnating substance so as to achieve a particularly appropriate wetting off the plug with the impregnating substance.

In an embodiment, the porous plastic is characterized by a porosity in the range of 0.1 to 50 µm, particularly in the range of 1 µm to 20 µm. In one embodiment, the porous plastic material is a porous sintered plastic material or a porous thermoplastic material. In one embodiment, the porous plastic material is a porous thermoplastic material being selected from the group consisting of polyethylene, polypropylene, polyethylene terephthalate or polytetrafluorethylene.

In an embodiment, the impregnating substance comprises a main component is a thermoset resin, particularly selected from an epoxy resin, a polyester resin, a polyurethane, a thermoplastic material, particularly a methyl methacrylate based adhesive, or a silicone.

In an embodiment, the casting substance comprises a main component is a thermoset resin, particularly selected from an epoxy resin, a polyester resin, a polyurethane, a thermoplastic material, particularly a methyl methacrylate based adhesive, or a silicone.

In an embodiment, the impregnating substance and casting substance comprise the same main component.

In an embodiment, the filler to be used with the main component of the casting substance is a substance chosen from the group consisting of talcum powder, glass fibers, mineral filler, aluminum hydroxide, cotton flocks, fumed silica, quartz flours, quartz sands, and corundum.

In an aspect, the present invention relates to an electrical feedthrough for an electrolytic capacitor that can be obtained by a method according to the preceding explanations.

Such an electrical feedthrough or feedthrough arrangement comprises a feedthrough opening in a feedthrough flange, a feedthrough pin located within the feedthrough opening, a plug sealing the feedthrough opening against one side of the feedthrough flange and a casting substance, particularly a filler-containing casting substance, filled into a space in the feedthrough opening between the feedthrough pin and a wall surrounding the feedthrough opening. Furthermore, the plug is impregnated with a filler-free curable impregnating substance that prevents leakage of the casting substance out of the electrical feedthrough arrangement.

In an aspect, the present invention relates to a method for conditioning a metallic surface of an electrical feedthrough of an electrolytic capacitor. This method comprises the steps explained in the following.

In a first step, the metallic surface of an electrical feedthrough of an electrolytic capacitor is anodized with a first acidic solution. This anodizing process results in the formation of a micro-structured surface on the metallic surface of the electrical feedthrough.

Afterwards, an oxide layer is applied onto the anodized metallic surface. This is done by applying a voltage to the metallic surface in a second acidic solution. This step may also be denoted as "forming". Preferably, the applied voltage is higher than an operative or nominal voltage of the electrolytic capacitor. By this process, an oxide layer is disposed on the anodized metallic surface. The formation of this oxide layer has no negative influence on the previously formed micro-structuring of the metallic surface of the electrical feedthrough. Since the oxide layer is applied by a voltage being higher than an operative voltage of the electrolytic capacitor, no further oxide is formed on the electrical feed-through during operation of the electrolytic capacitor. Consequently, the electrical contacts of the electrical feedthrough will not be impaired by an excessive oxide formation on their surface during operation of the electrolytic capacitor. Furthermore, due to the uniformly formed oxide layer the leakage current of the feedthrough pin of the electrical feedthrough is significantly reduced.

The surface treatment by anodizing and subsequently applying an oxide layer results in significantly higher adhesive forces between the treated surface of the electrical feedthrough and a casting substance applied onto the surface of the electrical feedthrough. Thus, the chemical and physical interaction between the casting substance and the surface of the electrical feedthrough is significantly enhanced by the performed surface treatment. As a result, the stability of the feedthrough pin of the electrical feed-through is significantly increased if this feedthrough pin is fixated in a feed-through opening by means of a casting substance.

In an embodiment, the treated components are rinsed with ultrapure water, subjected to pressurized air to blow of residual water, and subsequently dried in an oven.

In an embodiment, the first acidic solution is chosen from the group consisting of aqueous solutions of chromic acid, aqueous solutions of sulfuric acid, and aqueous solutions of phosphoric acid.

In an embodiment, the concentration of the acid in the first acidic solution lies in a range of from 1% by weight to 40% by weight, in particular of from 2% by weight to 35% by weight, in particular of from 3% by weight to 30% by weight, in particular of from 4% by weight to 25% by weight, in particular of from 5% by weight to 20% by weight, in particular of from 6% by weight to 15% by weight, in particular of from 7% by weight to 10% by weight, in particular of from 8% by weight to 9% by weight.

In an embodiment, the anodizing is carried out by electrically contacting a feedthrough pin and/or a feedthrough flange of the electrical feedthrough. This may be done by welding a wire made from the same material as the feedthrough pin and/or the feedthrough flange (e.g., aluminum, niobium, or tantalum) to the pin and/or the flange. Subsequently, a voltage lying in a range of from 5 V to 20 V, particularly of from 10 V to 15 V, is applied to the electrical feedthrough.

In an embodiment, the anodizing is done at a temperature lying in a range of from 5° C. to 30° C., in particular of from 10° C. to 25° C., in particular of from 15° C. to 20° C., in particular of from 18° C. to 24° C.

In an embodiment, the anodizing is performed corresponding to AMS 2469, AMS 2470, AMS 2471, AMS 2472, AMS 2482, ASTM B580, ASTM D3933, ISO 10074, or BS 5599. ASTM D3933-98 is a particularly appropriate standard for anodizing.

In an embodiment, the second acidic solution is an aqueous solution of boric acid or an aqueous solution of tartaric acid.

In an embodiment, the concentration of the acid in the second acidic solution lies in a range of from 1% by weight to 40% by weight, in particular of from 2% by weight to 35% by weight, in particular of from 3% by weight to 30% by weight, in particular of from 4% by weight to 25% by weight, in particular of from 5% by weight to 20% by weight, in particular of from 6% by weight to 15% by weight, in particular of from 7% by weight to 10% by weight, in particular of from 8% by weight to 9% by weight.

The voltage applied for forming an oxide layer lies, in an embodiment, in a range of from 200 V to 600 V, in particular of from 250 V to 550 V, in particular of from 300 V to 500 V, in particular of from 350 V to 450 V, in particular of from 375 V to 400 V. The height of the voltage may also depend on the material of the electrical feed-through. To give an example, the voltage may be chosen to lie within a range of 400 V to 600 V for the electrical feedthrough of an aluminum electrolytic capacitor having a nominal voltage of about 400 V and having a feedthrough pin and/or feedthrough flange made from aluminum. In another example, the voltage is chosen from a range of 250 V to 350 V in case of an electrical feedthrough for a tantalum electrolytic capacitor having a nominal voltage of about 250 V and having a feedthrough pin made from tantalum. Particularly, the voltage for forming the oxide layer is preferably chosen to be at least equally or above the operating voltage.

In an embodiment, the temperature chosen for the forming step lies in a range of from 50° C. to 99° C., in particular of from 55° C. to 95° C., in particular of from 60° C. to 90° C., in particular of from 65° C. to 85° C., in particular of from 70° C. to 75° C.

In an aspect, the present invention relates to a feedthrough for an electrolytic capacitor that is obtainable by a method according to the preceding explanations. Such an electrical feedthrough comprises a feedthrough flange defining a feedthrough opening and a feedthrough pin arranged inside the feedthrough opening. The electrical feedthrough furthermore comprises a casting substance being casted in a space between the feedthrough pin and a wall of the feed-through flange surrounding the feedthrough opening. The casting substance serves as electrical insulation of the feedthrough pin against the feedthrough flange. The better the mechanical and chemical contact between the casting substance and the feedthrough pin on the one hand and/or the casting substance and the wall surrounding the feedthrough opening on the other hand, the higher is the stability of a connection between the feedthrough pin and the feedthrough flange. The higher the stability of this connection is, the longer is the durability and lifetime of the electrolytic capacitor.

All embodiments of the feedthrough pin can be combined in any desired way and can be transferred either individually or in any arbitrary combination to the described assembly of the feedthrough pin of an electrolytic capacitor and the feedthrough flange, to any of the described methods, to the described contact element, and to any of the described electrical feedthroughs. Furthermore, all embodiments of the described assembly of the feedthrough pin of the electrolytic capacitor and the feedthrough flange can be combined in any desired way and can be transferred either individually or in any arbitrary combination to the described feedthrough pin, to any of the described methods, to the described contact element and to the described electrical feed-throughs. Furthermore, all embodiments of the individual methods can be combined in any desired way and can be transferred either individually or in any arbitrary combination to the described feedthrough pin, to the described assembly of the feedthrough pin and the feedthrough flange, to any of the other methods, to the contact element, and to the electrical feedthroughs. Likewise, all embodiments of the contact element can be combined in any desired way and can be transferred either individually or in any arbitrary combination to the described feedthrough pin, to the described assembly of the feedthrough pin and the feedthrough flange, to any of the described methods, and to the described electrical feedthroughs. Finally, all embodiments described with respect to any of the electrical feedthroughs can be combined in any desired way and can be transferred either individually or in any arbitrary combination to the described feedthrough pin, to the described assembly of the feedthrough pin and the feedthrough flange, to any of the described methods, to the described contact element and to the respective other of the electrical feedthroughs.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

Further details of aspects of the present invention will be described in connection to exemplary embodiments and accompanying Figures. In the Figures.

DETAILED DESCRIPTION

Figure 1:
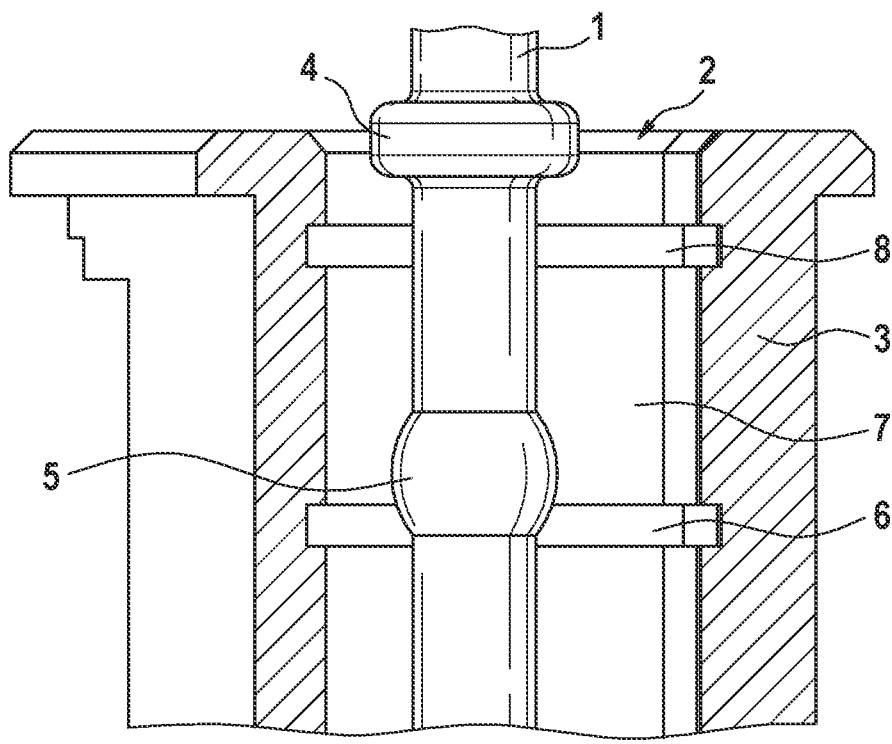
FIG. 1 shows an embodiment of an assembly of a feedthrough pin and a feedthrough flange in a partially cut view.
Figure 2:
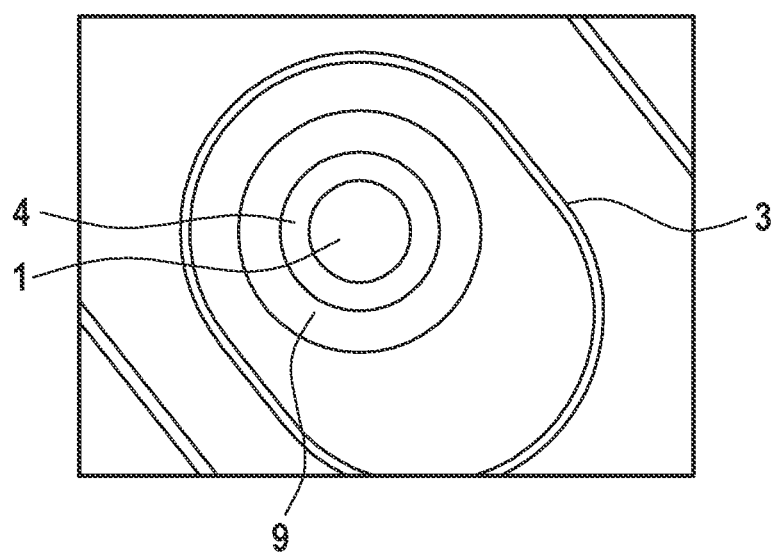
FIG. 2 shows a top view onto the assembly of FIG. 1.
Figure 3:
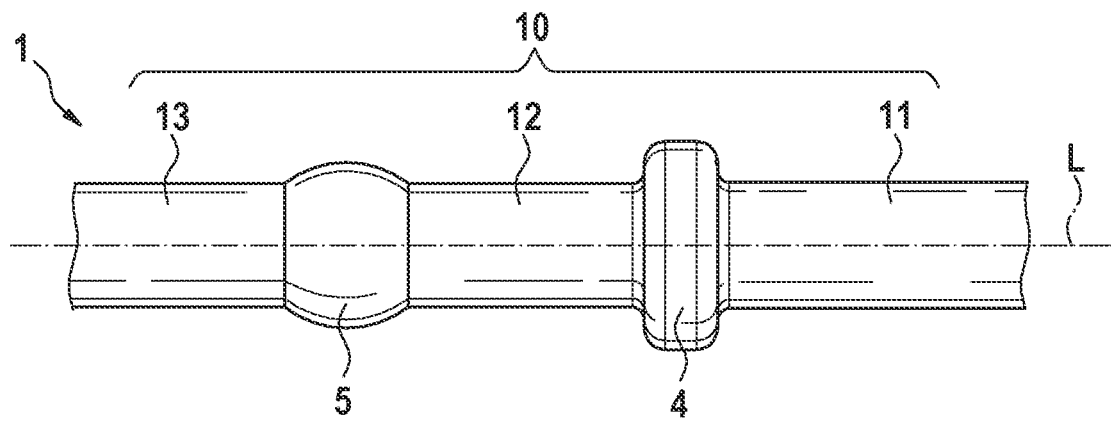
FIG. 3 shows an embodiment of a feedthrough pin.

FIGS. 1 to 3 illustrate one aspect of the present invention, namely a feedthrough assembly comprising a feedthrough pin 1 and a feedthrough flange 3.

FIG. 1 shows the feedthrough pin 1 arranged inside a feedthrough opening 2 formed by the feedthrough flange 3. The feedthrough pin 1 and the feedthrough flange 3 form a feedthrough assembly. The feedthrough pin 1 comprises a first bead 4 and a second bead 5 located below the first bead 4. The first bead 4 is arranged with respect to the feedthrough opening 2 such that it partially extends over a top surface of the feedthrough flange 3 in the area of the feed-through opening 2. The second bead 5 is arranged within the feedthrough opening 2 such that it is located at the same height as a first groove 6 and a space 7 defined between the first groove 6 and a second groove 8.

For fixating the feedthrough pin 1 in the feedthrough opening 2, a casting material, such as an epoxy resin, is filled into the feedthrough opening 2. The combination of the second bead 5, the first groove 6 and the second groove 8 serves for a high strength of the fixation of the feedthrough pin 1 within the feedthrough opening 2, because the second bead 5, the first groove 6 and the second groove 8 urge the respective casting substance to adopt an irregular structure in this area of the feedthrough opening 2. Thus, the second bead 5, the first groove 6 and the second groove 8 synergistically act together in strengthening the fixation of the feedthrough pin 1 within the feedthrough opening 2.

The first bead 4 serves for protecting the casting substance filled into the feedthrough opening 2 against laser light applied to an upper portion of the feedthrough pin 1 for laser welding an electrical contact to the upper portion of the feedthrough pin 1. By masking the casting substance in the feedthrough opening 2, the first bead 4 serves for an extended lifetime of the casting substance and thus for a longer durability of the assembly of feedthrough pin 1 and feedthrough flange 3.

FIG. 2 shows the assembly of FIG. 1 in a top view. In this and in all following Figures, the same numeral references will be used for similar elements. FIG. 2 particularly illustrates that the first bead 4 radially protrudes from an outer contour of a portion of the feedthrough pin 1 that extends axially over the first bead 4. Consequently, a portion of an epoxy resin 9 filled into a filling opening of the feedthrough flange 3 is shielded and thus protected by the first bead 4 against laser light applied to the top portion of the feedthrough pin 1.

FIG. 3 shows an embodiment of a feedthrough pin 1, in which the general structure of the feed-through pin 1 can be seen. It comprises a first section 11, a second section 12 and a third section 13 that make up an elongated body 10 that extends along a longitudinal axis L. The first bead 4 is arranged between the first section 11 and the second section 12. The second bead 5 is arranged between the second section 12 and the third section 13. Both the first bead 4 and the second bead 5 protrude radially from an outer contour of each of the first section 11, the second section 12 and the third section 13 of the elongated body 10. In this context, the first bead 4 further protrudes from the outer contour of the first section 11 and the second section 12 than the second bead 5 protrudes from the outer contour of the second section 12 and the third section 13.

Figure 4:
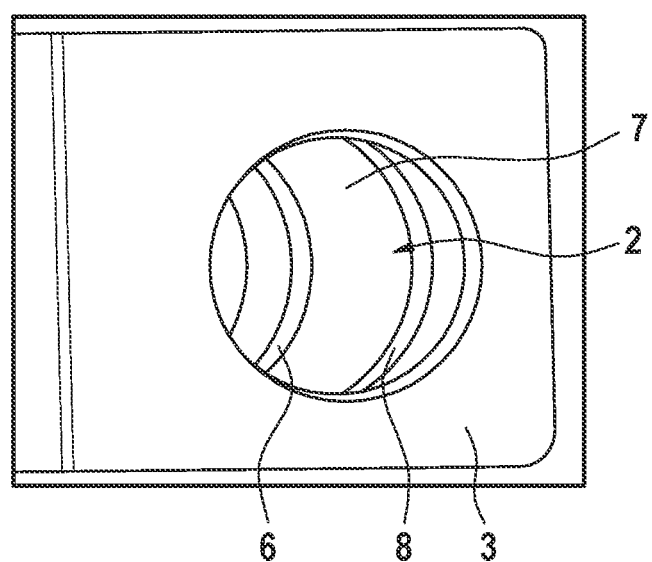
FIG. 4 shows an embodiment of a feedthrough flange.

FIG. 4 shows an embodiment of a feedthrough flange 3, comprising a feedthrough opening 2. The feedthrough 2 comprise a first groove 6 and a second groove 8 as well as an intermediate space 7 between the first groove 6 and the second groove 8 as illustrated in FIG. 4. The feedthrough pin 1 shown in FIG. 3 is intended to be inserted into the feedthrough opening 2 of the feedthrough flange 3 of FIG. 4.

In the following FIGS. 5 to 7, another aspect of the present invention, namely a contact element for establishing a reliable and mechanical stable connection between the above described feedthrough assembly and a further electric component. Therein, FIG. 5 illustrates the manufacturing of the contact element, and FIGS. 6 and 7 the contact element.

Figure 5A:
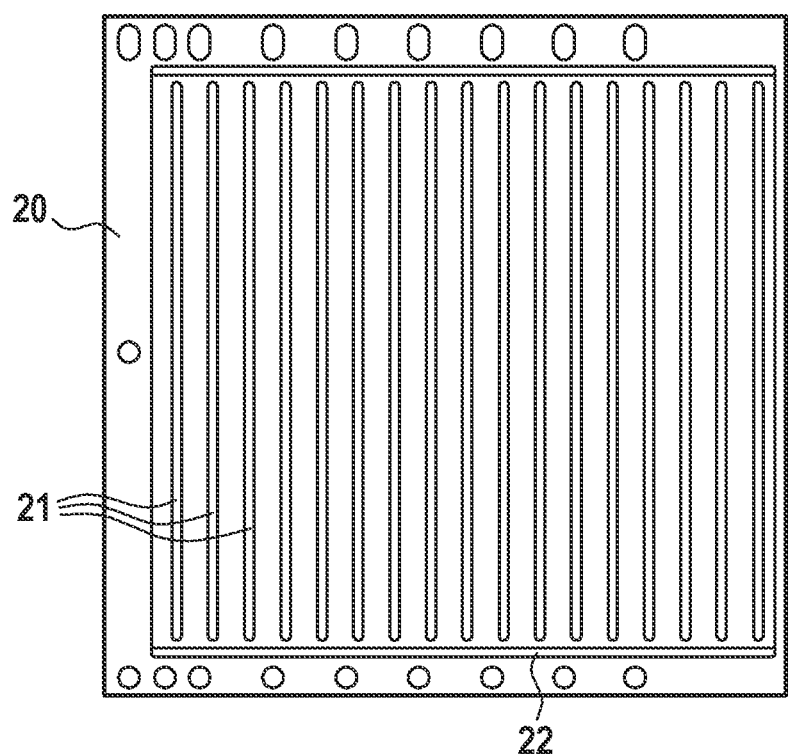
FIG. 5A illustrates a first step of an embodiment of a method for manufacturing a composite contact element.

FIG. 5A shows a front side of a panel 20 serving as plate. The panel 20 is made from aluminum. A front side of the panel 20 comprises a plurality of recesses 21, which are already filled with a layer of nickel 22. The portions of the panel 20 not coated with nickel 22 have been masked prior to galvanically applying the nickel 22.

Excess nickel 22 is then abraded so that the panel 20 obtains a smooth surface comprising aluminum portions 23 and nickel-filled recesses 21. This is shown in FIG. 5B.

Figure 5B:
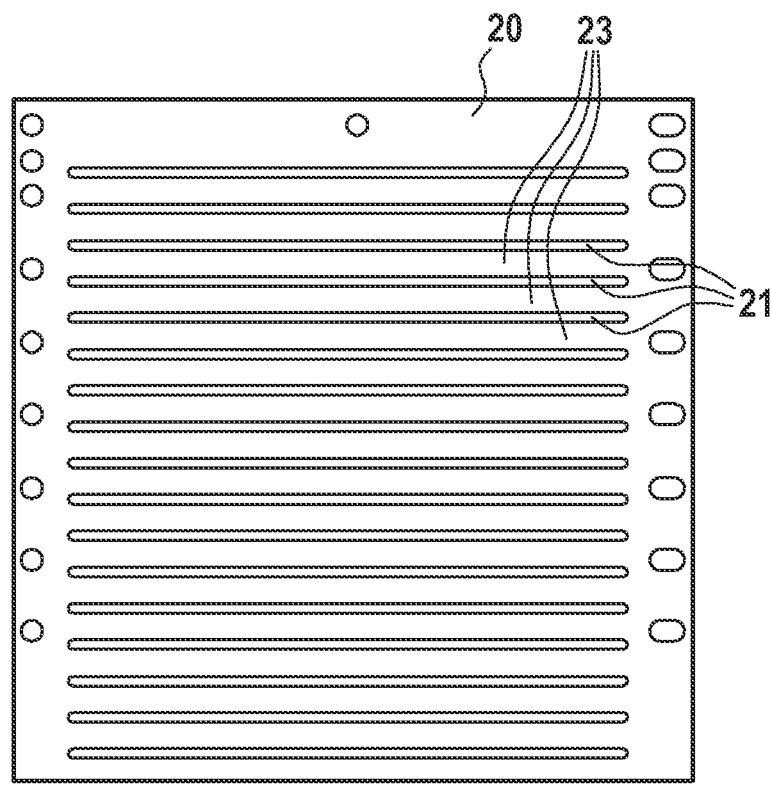
FIG. 5B illustrates a second step of an embodiment of a method for manufacturing a composite contact element.
Figure 5C:
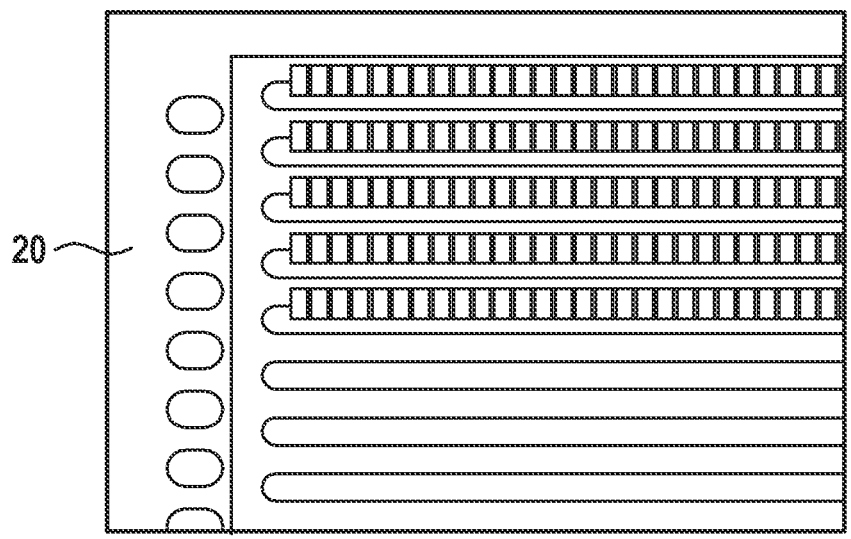
FIG. 5C illustrates a third step of an embodiment of a method for manufacturing a composite contact element.
Figure 5D:
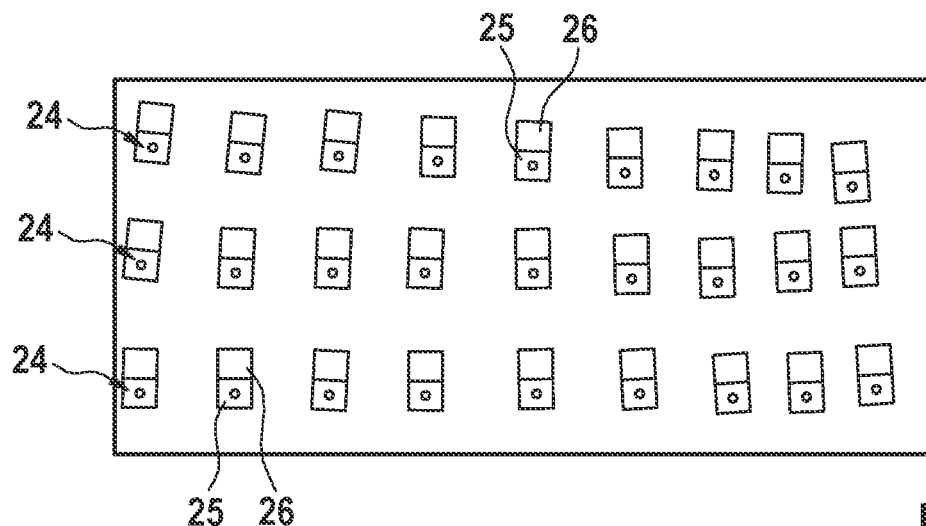
FIG. 5D shows a plurality of contact elements manufactured with a method as illustrated in FIGS. 5A to 5C.

Afterwards—as shown in FIG. 5C—a plurality of contact elements can be punched out of the plate 20. These contact elements 24 are shown in FIG. 5D. Each contact element 24 comprises a first section 25 comprising aluminum only and a second section 26 comprising both aluminum and nickel. In the view of FIG. 5D, only the nickel portion in the second section 26 is visible since the aluminum section in this portion lies beneath the nickel section.

Figure 6A:
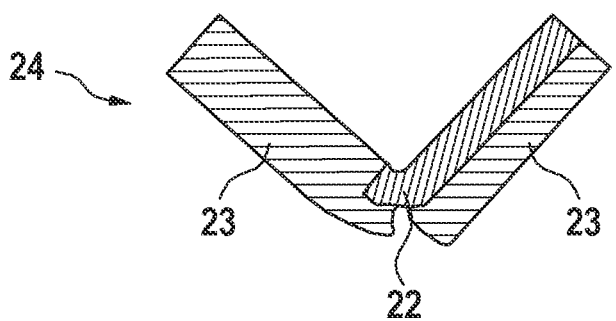
FIG. 6A illustrates the results of a bending test of a contact element according to FIG. 5D.
Figure 6B:
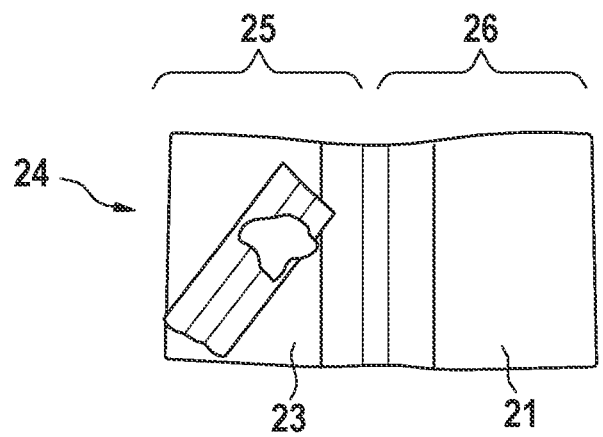
FIG. 6B illustrates the results of a bending test of a contact element according to FIG. 5D.

FIG. 6A and FIG. 6B show the results of a 90° bending test on the transition site between aluminum and nickel. These results clearly show that the aluminum 23 breaks, whereas the nickel 21 passes the bending test. The contact between the aluminum 23 and the nickel 22 remains stable, even after bending. Thus, the galvanically applied nickel 22 strongly adheres to the aluminum 23.

Figure 7A:
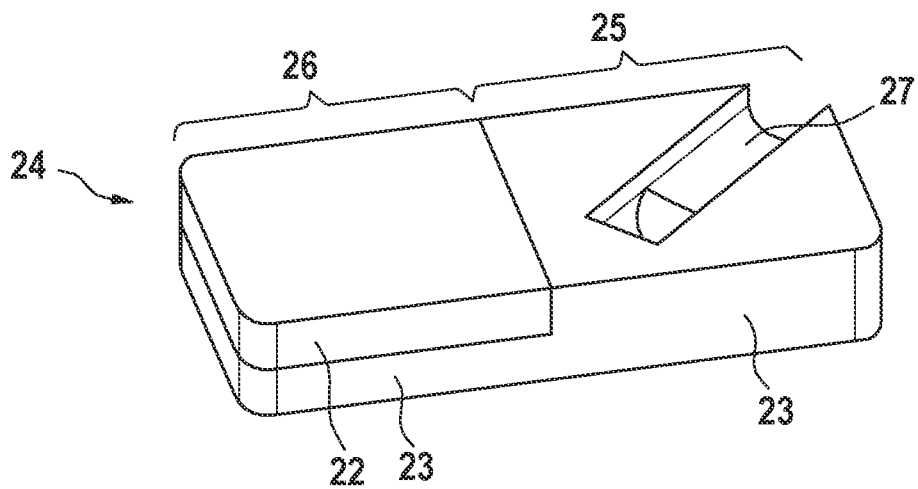
FIG. 7A shows a first embodiment of a contact element that has been produced by a method as illustrated in FIGS. 5A to 5C.

FIG. 7A shows a first embodiment of a contact element 24 produced by a method as illustrated in FIGS. 5A to 5C. In a first section 25 that comprises aluminum 23 only, a receiving recess 27 for receiving a feedthrough pin of an electrolytic capacitor is provided. This feedthrough pin can be inserted into the receiving recess 27 from a bottom side of the contact element 24 via a through-opening in the contact element, wherein the through-opening joins the recess 27. Advantageously, the terminal end of such an inserted feedthrough may be bent about 90 degrees to rest in the recess 27, wherein the terminal end may be welded to the contact element 24 away from the through-opening and away from the feedthrough opening, which is substantially filled with the epoxy resin 9 as described above.

A second section 26 comprises both aluminum 23 and nickel 22. The nickel portion of the second section 26 serves for contacting, e.g., a nickel ribbon, and thus establishes an electric contact between an electrolytic capacitor, the feedthrough pin of which is received in the receiving recess 27 and the nickel ribbon.

Figure 7B:
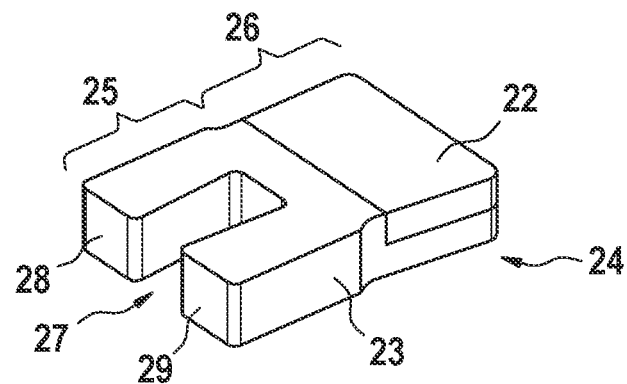
FIG. 7B shows a second embodiment of a contact element that has been produced by a method as illustrated in FIGS. 5A to 5C.

FIG. 7B shows a second embodiment of a contact element 24 in which a receiving recess 27 for a feedthrough pin of an electrolytic capacitor is formed between a first leg 28 and a second leg 29 of the first section 25 made of aluminum only. A second section 26 comprising both aluminum 23 and nickel 22 is basically identical to the second section 26 of the contact element 24 shown in FIG. 7A, even though it has a slightly different shape.

In the following FIGS. 8 to 14, another aspect of the present invention is illustrated, namely a feedthrough assembly and methods of manufacture thereof.

Figure 8:
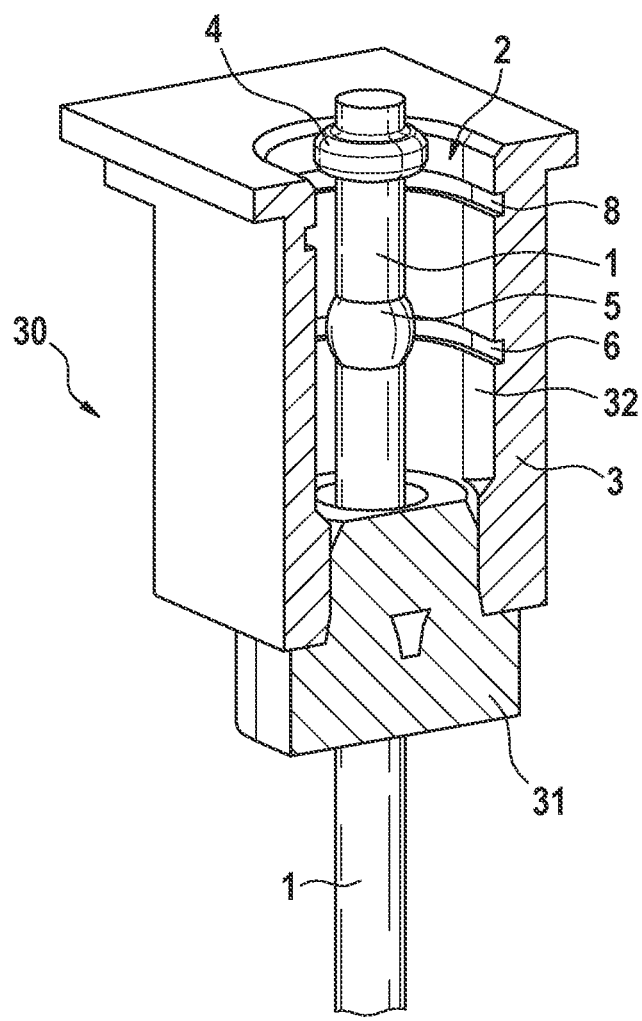
FIG. 8 shows an embodiment of an electrical feedthrough of an electrolytic capacitor.

FIG. 8 shows an embodiment of an electrical feedthrough 30 of an electrolytic capacitor. This electrical feedthrough 30 is very similar to the assembly shown in FIG. 1. Thus, it comprises a feedthrough pin 1 arranged in a feedthrough opening 2 defined by a feedthrough flange 3. A wall 32 surrounding the feedthrough opening 2 comprises a first groove 6 and a second groove 8 to ameliorate the fixation of the feedthrough pin 1 with respect to the feedthrough flange 3.

In addition to the arrangement shown in FIG. 1, the electrical feedthrough in FIG. 8 comprises a plug 31 that is pushed into one end of the feedthrough opening 2 facing an interior of an electrolytic capacitor. This plug 31 is impregnated with a filler-free epoxy resin and prevents a filler-containing epoxy resin used for filling a free space between the feed-through pin 1 and the wall 32 of the feedthrough flange 3 from leaking into an inside of the electrolytic capacitor. In this context, impregnating the plug 31 with a filler-free epoxy resin has two functions. First, the feed-through pin 1 is fixated in its relative position to the feedthrough flange 3. Furthermore, the impregnation with a filler-free epoxy resin prevents any further epoxy resin filled into the remaining space within the feed-through opening 2 from penetrating into and through the plug 31.

Figure 9:
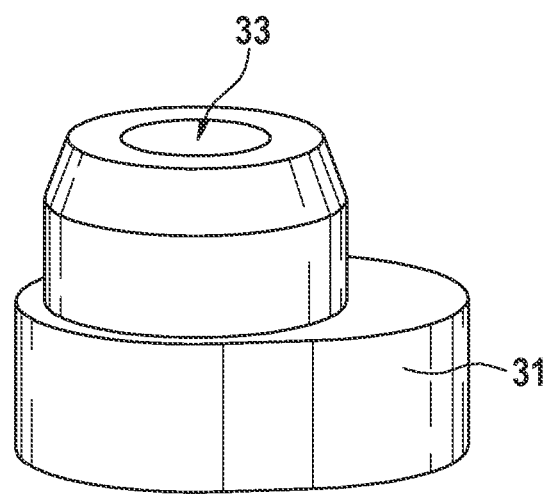
FIG. 9 shows a detailed view of a plug used in the electrical feed-through shown in FIG. 8.

FIG. 9 shows an enlarged view of the plug 31 of FIG. 8. The shape of the plug 31 may be adjusted as needed to achieve a good fit of the plug 31 in an end of the feedthrough opening 2 defined by the feed-through flange 3. The plug 31 comprises an opening 33 through which the feedthrough pin 1 can be pushed (cf. FIG. 8). Afterwards, the feedthrough pin 1 extends on a first side of the plug 31 and on a second side of the plug 31, as shown in FIG. 8.

Figure 10:
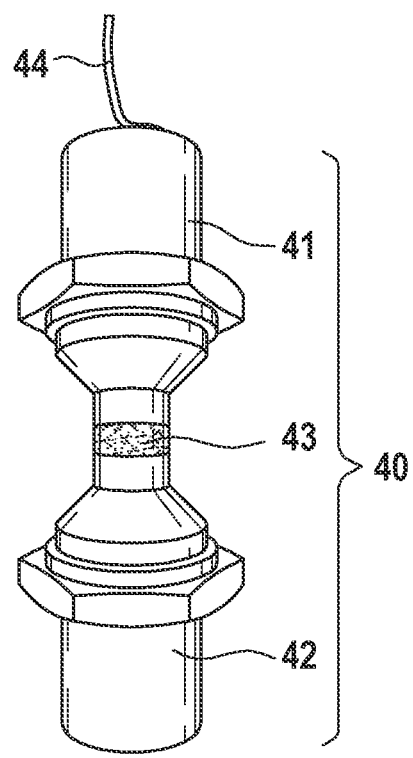
FIG. 10 shows an exemplary embodiment of a test specimen used for assessing the strength of a connection between an epoxy resin and a treated aluminum surface.

FIG. 10 shows a test specimen 40, comprising a first aluminum body 41 and a second aluminum body 42, as well as a layer of epoxy resin 43 connecting the first aluminum body 41 and the second aluminum body 42. The aluminum used for making the first aluminum body 41 and the second body 42 has a purity of 99.99%. An aluminum wire 44 is used for contacting the first aluminum body 41.

Figure 11:
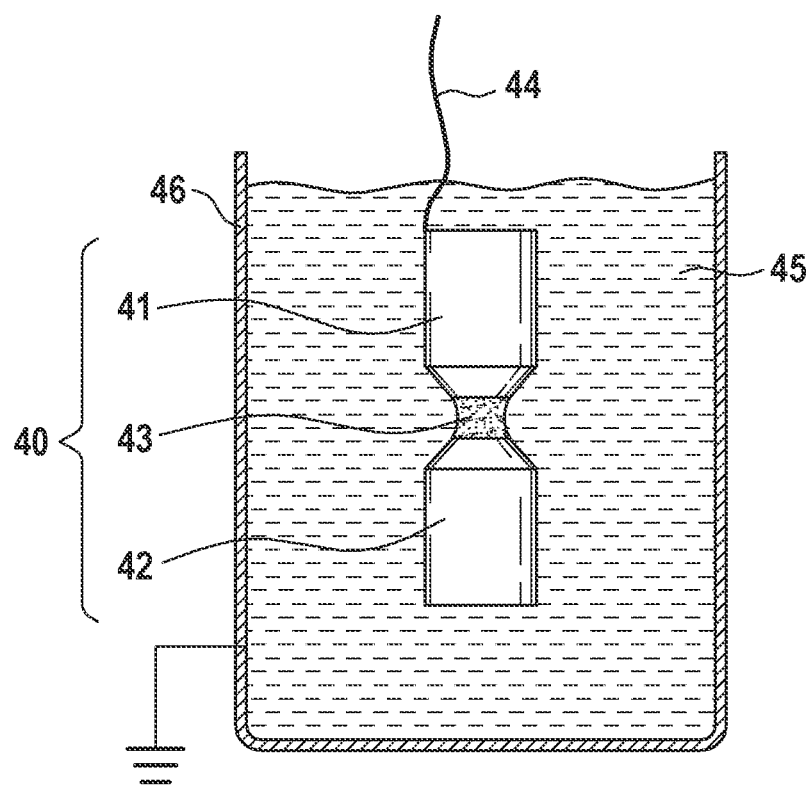
FIG. 11 shows an exemplary embodiment of a test arrangement for testing the strength of a connection between an epoxy resin and a treated aluminum surface on the test specimen as shown in FIG. 10.

For analyzing the effects of different treatments of the surfaces of the first aluminum body 41 and of the second aluminum body 42 with respect to a connection to the epoxy resin 43, a testing arrangement as shown in FIG. 11 was used. The test specimen 40 was put into a commercially available aluminum capacitor electrolyte 45 provided in an aluminum cup 46. The test was carried out at a temperature of 85° C. and a voltage of 450 V supplied with the help of the aluminum wire 44. The aluminum cup 46 was used as counter electrode. The test specimen 40 was subjected to these conditions for a period of 5 hours. Afterwards, the test specimen 40 was transferred to a tensile test device and the maximum braking force was tested. The results of this tensile test are depicted in FIG. 12.

Figure 12:
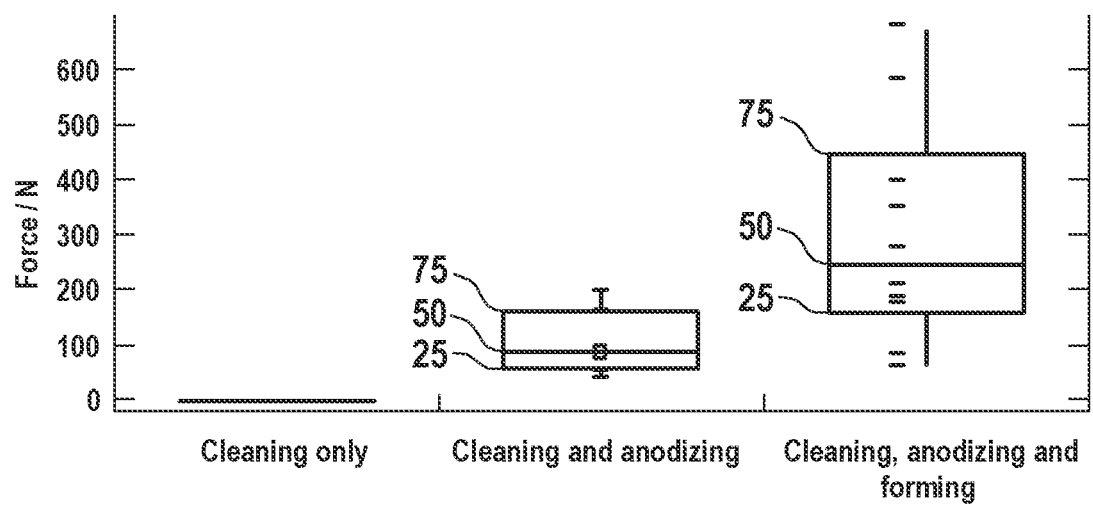
FIG. 12 shows first results of a test on test specimens according to FIG. 10 in a test arrangement according to FIG. 11.

In a first set of test specimens, the aluminum surface of the test specimens was cleaned only with acetone and water ("cleaning only" in FIG. 12, serving as negative control).

In a second set of test specimens, the surface of the test specimens was cleaned and anodized with phosphoric acid ("cleaning and anodizing" in FIG. 12). For this purpose, the test specimens were subjected to a voltage of 15 V in a solution of 10% by weight of phosphoric acid (85% concentration) and 90% by weight water for 20 minutes at a temperature of 18° C. to 24° C. By this anodizing process, a micro-structured surface was formed on the test specimens.

In a third set of test specimens, the test specimens were subjected to the cleaning and anodizing process as described before, and additionally to a forming process for forming an oxide layer on the aluminum surface ("cleaning, anodizing and forming" in FIG. 12). For carrying out this forming process, the anodized test specimens were subjected to a voltage of 550 V in a solution of 7.5% by weight boric acid in 92.5% by weight water for a time period of 30 minutes at a temperature of 85° C. The chosen voltage of 550 V was higher than an intended operational voltage of an aluminum electrolytic capacitor.

As can be seen from FIG. 12, the maximum braking force was 0 N in case of test specimens the surface of which was only cleaned. Here, the treatment in the aluminum electrolyte prior to performing the tensile test resulted in a detachment of the adhesive surface between the epoxy resin 43 and the first aluminum body 41, as can be seen by the very left pair of the first test body 41 and the second test body 42 of FIG. 13.

Figure 13:
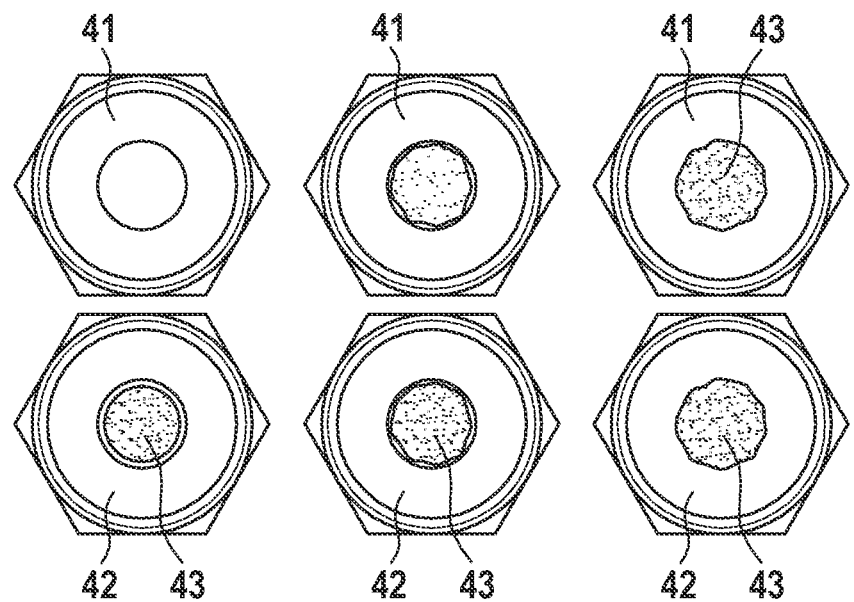
FIG. 13 shows second results of a test on test specimens according to FIG. 10 in a test arrangement according to FIG. 11.

If the aluminum surface of the first aluminum body 41 and the second aluminum body 42 was not only cleaned, but additionally anodized, a median maximum breakage force of 84 N was observed (cf. FIG. 12). Here, the indications "25", "50", and "75" refer to the 25th percentile, the 50th percentile and the 75th percentile of the obtained results. As depicted in FIG. 13 (confer the middle pair of first aluminum body 41 and second aluminum body 42) only adhesive failures between the surface of the first aluminum body 41 and the epoxy resin 43 were observed.

In case of cleaning, anodizing and forming, the median maximum breakage force was as high as 248 N (cf. FIG. 12). As can be seen in the very right pair of the first test body 41 and the second test body 42 of FIG. 13, only cohesive failures within the epoxy resin 43 were observed. Thus, the adhesive force between the epoxy resin 43 and the treated aluminum surface of the first aluminum body 41 and the second aluminum body 42 was higher than the internal cohesive forces within the epoxy resin layer 43. This clearly shows the superiority of the process comprising anodizing and forming an oxide layer on the aluminum surface of the test specimens.

Figure 14A:
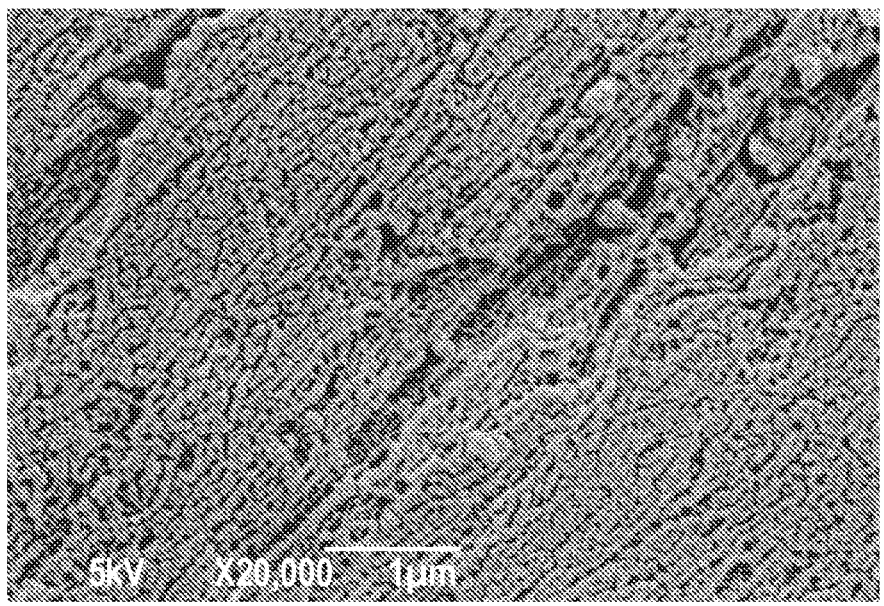
FIG. 14A shows a scanning electron microscope image of an aluminum surface after an anodizing process.

FIG. 14A shows a scanning electron microscopy image of an aluminum surface of an aluminum body after anodizing with phosphoric acid. A micro-structuring of the surface is clearly visible. This micro-structuring is supposed to be responsible for the significant better adhesion of the epoxy resin to the aluminum than in case of an aluminum surface that is only cleaned.

Figure 14B:
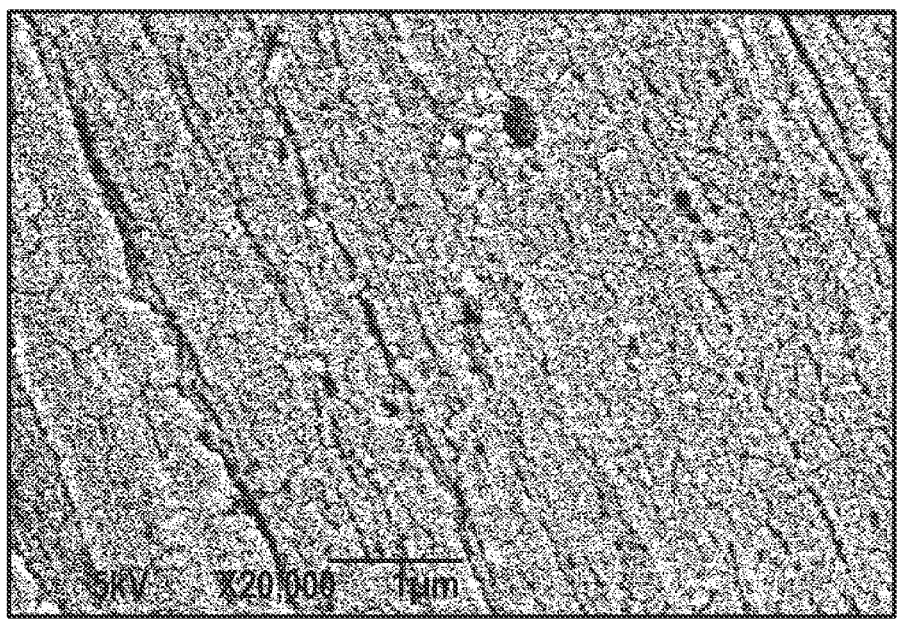
FIG. 14B shows a scanning electron microscope image of the surface of FIG. 14A after having formed an additional aluminum oxide layer on it.

FIG. 14B shows a scanning electron microscopy image of the same aluminum surface after having been subjected to a forming process at 550 V (confer the explanations with respect to FIGS. 12 and 13). The micro-structuring is still present, even though an oxide layer has been additionally formed above the micro-structuring. The combination of micro-structuring and oxide layer is responsible for the significantly enhanced adhesion of the epoxy resin.

By carrying out both the anodizing and the forming process in which an oxide layer is formed on the metallic surface of an electrical feed-through of an electrolytic capacitor, a long-term stable and reliable electric feed-through is obtained. The electric properties of the capacitor are ameliorated due to the low leakage current of the electrical feed-through resulting from the evenly formed oxide layer.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. Feedthrough pin of an electrolytic capacitor for contacting an electrode of the electrolytic capacitor and providing an electrical contact of the electrolytic capacitor on an outside of the electrolytic capacitor, the feedthrough pin comprising a longitudinally extending body,
a first circumferential protrusion that is capable of assuring position is arranged between a first section of the longitudinally extended body wherein the first circumferential protrusion runs around a longitudinal axis and a second section of the longitudinally extended body and does not introduce mechanical deformation to the first circumferential protrusion, wherein the first circumferential protrusion runs around a longitudinal axis of the longitudinally extended body and extends radially outwards over an outer contour of the first section of the longitudinally extended body and an outer contour of the second section of the longitudinally extended body and said first circumferential protrusion partially extends over a top surface of a feedthrough flange.

2. Feedthrough pin of an electrolytic capacitor for contacting an electrode of the electrolytic capacitor and providing an electrical contact of the electrolytic capacitor on an outside of the electrolytic capacitor, the feedthrough pin comprising a longitudinally extending body,
a first circumferential protrusion is arranged between a first section of the longitudinally extended body and a second section of the longitudinally extended body, wherein the first circumferential protrusion runs around a longitudinal axis of the longitudinally extended body and extends radially outwards over an outer contour of the first section of the longitudinally extended body and an outer contour of the second section of the longitudinally extended body and said first circumferential protrusion partially extends over a top surface of a feedthrough flange;
wherein a second circumferential protrusion is arranged between the second portion of the elongated body and a third portion of the elongated body, wherein the second circumferential protrusion runs around the longitudinal axis of the elongated body and extends radially outwards over an outer contour of the second portion of the elongated body and an outer contour of the third portion of the elongated body.

3. Feedthrough assembly of an electrolytic capacitor comprising a feedthrough pin and a feedthrough flange having a feedthrough opening in which the feed-through pin is disposed, the feedthrough pin serving to contact an electrode of the electrolytic capacitor and to provide an electrical contact of the electrolytic capacitor on an outside of the electrolytic capacitor and comprising a longitudinally extended body, a second circumferential protrusion is arranged between a second section of the longitudinally extended body and a third section of the longitudinally extended body, wherein the second circumferential protrusion runs around a longitudinal axis of the longitudinally extended body and extends radially outwards over an outer contour of the second section of the longitudinally extended body and an outer contour of the third section of the longitudinally extended body, and
a wall of the feedthrough flange surrounding the feedthrough opening comprises a first groove and a second groove facing the feedthrough pin, wherein the feedthrough pin and the feedthrough flange are arranged such that the second circumferential protrusion is located in region of the feedthrough opening in which the wall comprises at least one of the first groove and the second groove and a section between the first groove and the second groove.

4. Feedthrough assembly according to claim 3, wherein the feedthrough pin additionally comprises a first circumferential protrusion being arranged between the first section of the longitudinally extended body and the second section of the longitudinally extended body, wherein the first circumferential protrusion runs around the longitudinal axis of the longitudinally extended body and extends radially outwards over an outer contour of the first section of the longitudinally extended body and an outer contour of the second section of the longitudinally extended body.

5. Method for manufacturing a composite contact element for an electrolytic capacitor, the method comprising the following steps:
   a) forming a recess into a front side of a plate of a first metal being chosen from the group consisting of aluminum, tantalum, niobium, and zirconium;
   b) masking a backside and edges of the plate with a masking component;
   c) galvanically applying a layer of a second metal onto the front side and the recess, the second metal being chosen from the group consisting of nickel, nickel-iron, zinc, copper, silver, palladium, gold, platinum or an alloy thereof;
   d) abrading the front side of the plate so that the second metal remains in the recess and that a front-sided surface of the first metal is flush with a surface of the second metal in the recess; and
   e) punching a contact element out of the plate, the contact element comprising a first section comprising the first metal only and a second section comprising the first metal and the second metal.

6. Method according to claim 5, wherein the plate and the recess filled with the second metal are tempered at a temperature in a range of 100° C. to 400° C. prior to the punching step.

7. Contact element, obtainable by a method according to claim 5.

8. Method for manufacturing an electrical feedthrough for an electrolytic capacitor, the method comprising the following steps:
   a) providing a plug made from a porous plastic material and being designed and sized to fit into a feedthrough opening of an electrolytic capacitor, the feedthrough opening serving for housing a feedthrough pin of an electrolytic capacitor for contacting an electrode of the electrolytic capacitor and providing an electrical contact of the electrolytic capacitor on an outside of the electrolytic capacitor;
   b) guiding a feedthrough pin through an opening in the plug to obtain a plug-pin arrangement in which a first part of the feedthrough pin is located on a first side of the plug and a second part of the feedthrough pin is located on a second side of the plug;
   c) inserting the plug-pin arrangement into a feedthrough opening of a feed-through flange of an electrolytic capacitor such that there remains a space between the feed-through pin and a wall surrounding the feed-through opening;
   d) impregnating the plug with a filler-free curable impregnating substance and allowing the impregnating substance to set;
   e) casting a filler-containing curable casting substance into the space between the feed-through pin and the wall surrounding the feed-through opening and allowing the casting substance to set.

9. Method according to claim 8 wherein the porous plastic material is characterized by a porosity in the range of from 0.1 to 50 µm and is a porous sintered plastic material or a porous thermoplastic material, wherein particularly the porous thermoplastic is selected from the group consisting of polyethylene, polypropylene, polyethylene terephthalate or polytetrafluorethylene.

10. Method of claim 8 wherein the impregnating substance and the casting substance each comprise a main component chosen independently is a thermoset resin, particularly selected from an epoxy resin, a polyester resin, a polyurethane, a thermoplastic material, particularly a methyl methacrylate based adhesive, or a silicone, wherein particularly the impregnating substance and the casting substance comprises the same main component.

11. Electrical feedthrough for an electrolytic capacitor, obtainable by a method according to claim 8.

12. Method for conditioning a metallic surface of an electrical feedthrough of an electrolytic capacitor, the method comprising the following steps:
   a) anodizing the metallic surface of an electrical feedthrough of an electrolytic capacitor, particularly of a feedthrough pin and/or a feedthrough flange with a first acidic solution; and
   b) forming an oxide layer on the anodized metallic surface by applying, in a second acidic solution, a voltage to the metallic surface that is higher than an operating voltage of the electrolytic capacitor.

13. Method according to claim 12 wherein the first acidic solution is chosen from the group consisting of aqueous solutions of chromic acid, aqueous solutions of sulfuric acid, and aqueous solutions of phosphoric acid.

14. Method according to claim 12 wherein the second acidic solution is an aqueous solution of boric acid or an aqueous solution of tartaric acid.

15. Electrical feedthrough for an electrolytic capacitor, obtainable by a method according to claim 12.

* * * * *